Dec. 25, 1962 — D. C. LAW — 3,069,709
DOCKBOARDS
Filed Jan. 14, 1954 — 2 Sheets-Sheet 1

INVENTOR
Don C. Law.
BY Searman & Searman
ATTORNEYS.

Dec. 25, 1962 D. C. LAW 3,069,709
DOCKBOARDS
Filed Jan. 14, 1954 2 Sheets-Sheet 2
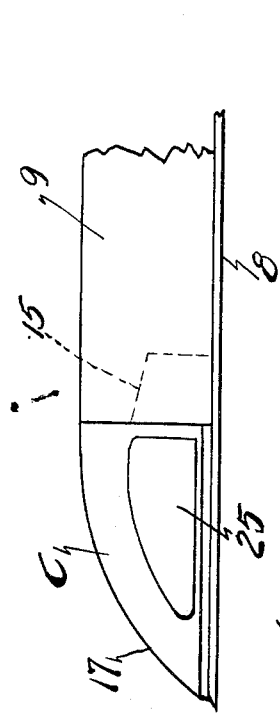
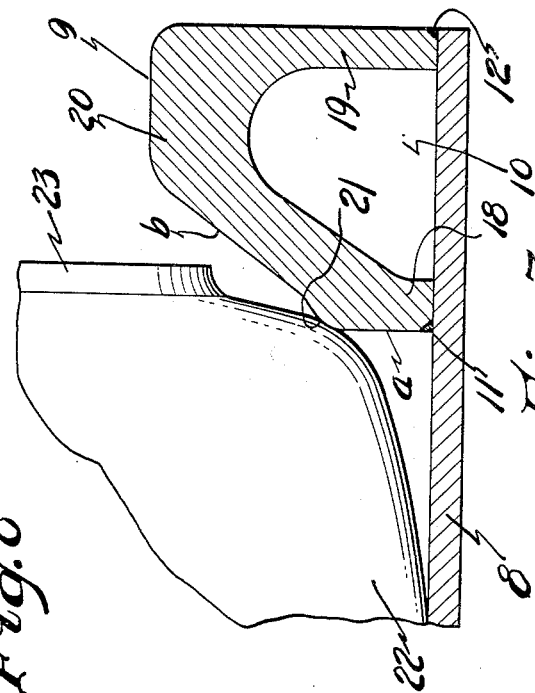
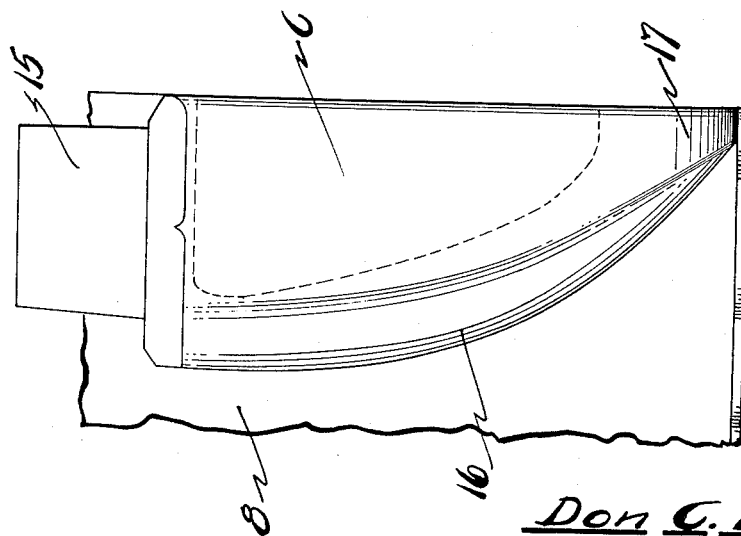
INVENTOR
Don C. Law.
BY Harmon & Harmon.
ATTORNEYS.

United States Patent Office 3,069,709
Patented Dec. 25, 1962

3,069,709
DOCKBOARDS
Don C. Law, Bay City, Mich., assignor to Magline, Inc., Pinconning, Mich.
Filed Jan. 14, 1954, Ser. No. 404,113
3 Claims. (Cl. 14—72)

This invention relates to dockboards for bridging the space between a truck, freight car or other carrier, and a loading platform, or between two freight cars, or motor trucks for loading or unloading merchandise of any nature.

One of the prime objects of the invention is to design a lightweight dockboard of the foregoing character, which is provided with special shaped side curbs or rails so designed and shaped as to eliminate contact between the mobile equipment wheels and the side curbs, contact being made only by the tires of the equipment.

Another object of the invention is to design a dockboard provided with side curbs, the inner side walls of which are outwardly sloped to eliminate the possibility of the equipment wheel rims coming into contact therewith, avoiding damaging, gouging, and weakening of the structure, thus insuring long life and wear; preventing tire damage due to contact with gouged rough surfaces, and insuring greater safety to personnel and equipment as the dockboard is adjusted and/or moved from place to place.

A further object is to provide reinforced curb ends on the board, permitting easy and sharper angle turns in limited turning areas, and providing for greater strength at the critical shock points.

Still a further object is to provide a dockboard including outwardly projecting, horizontally extending beaded sections on the side curbs, said sections serving to minimize scuffing or rubbing contact of the wheel tires on the curb and reducing tire damage and wear, thus making for easier operation of the mobile equipment traveling thereover.

A further object still is to design a rugged, lightweight dockboard which can be easily handled by but one workman, and make ample provision for trucks with low underclearance.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

FIG. 3 is an enlarged, fragmentary, transverse sectional view showing a truck wheel on the dockboard and illustrating the rim clearance etc.

FIG. 5 is a transverse sectional view showing a modified side curb.

FIG. 6 is an enlarged, fragmentary side elevational view of the dockboard.

Figure 1:
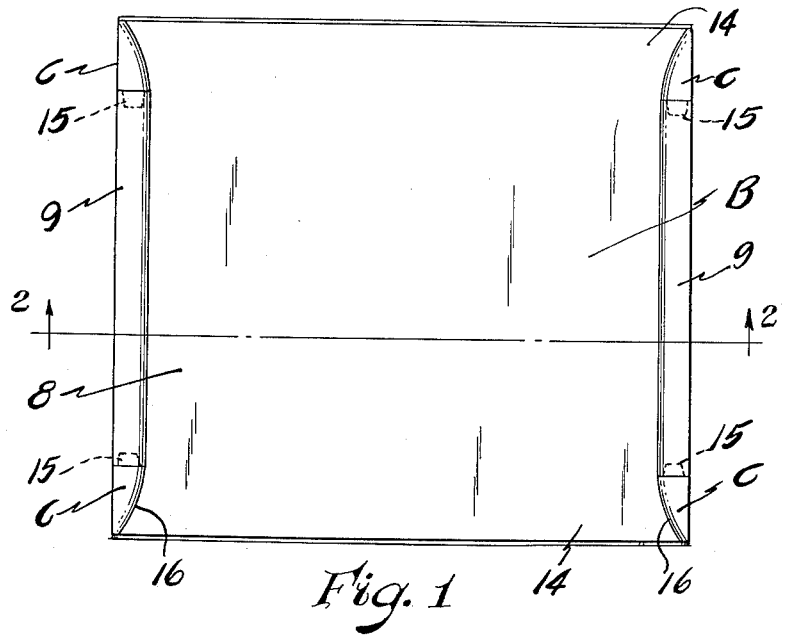
FIG. 1 is a top plan view of a dockboard illustrating my new construction and design.

Dockboards such as hereinafter described are adapted to provide a runway between two spaced-apart surfaces of the same or different heights for loading or unloading trucks and freight cars, or vehicles of any nature.

For carrying heavy loads such as at present encountered, it is necessary that the curbs or side rails be so designed and constructed as to provide sufficient strength to support the loads and prevent a truck running off the dockboard at the sides, and it is further necessary that the height of the side curbs be held to a minimum, so as not to be struck by the running gear or body portion of a truck normally utilized in this work, thus increasing the maneuverability of the trucks, and permitting swinging the body portions of the trucks over the side rails during the turning movements of the trucks. To provide a smooth runway for easy and quiet operation of the trucks, I find it advantageous to provide end sections for the structure, and these sections can be pitched or sloped to provide a smooth, continuous runway with the curbs flared to provide increased turning area.

In the accompanying drawings I have shown the preferred embodiment of my invention, the dockboard being generally indicated by the letter B, and consists of a floorplate 8 having side curbs 9 welded to the face thereof immediately adjacent the side edges of the floorplate. These side curbs are preferably in the form of an extrusion, being hollow as at 10 and is cut to predetermined length as will be hereinafter described. The floor plate 8 forms the runway of the dockboard and the side curbs 9 are secured to the upper face thereof adjacent the side edges by welding as at 11 and 12.

The floorplate 8 is usually of greater length than is the curb rail 9, thus providing lip sections 14 on the ends of the dockboard, and these lip sections can be slightly pitched or curved to provide a smooth continuous running surface for mobile equipment operating over the dockboard.

Cast curb sections C form a continuation of the curb rails 9, each section being formed with a projecting lug 15 which is accommodated in the opening 10 of the curb rail 9, and here again, these curb sections C are welded to the floorplate adjacent the side edges thereof and to the curb rails to form a continuation thereof and contact with the curb sections and rails can be made only by the tires of the vehicle wheels, never with their rims.

The inner face of each curb section C is outwardly flared as at 16 and is upwardly curved or flared from its free end as at 17, permitting easier, sharper angle turns in limited turning areas. This flared construction has the ability to withstand the impact of wheel collision caused by sharp turn-offs and the like.

Figure 2:
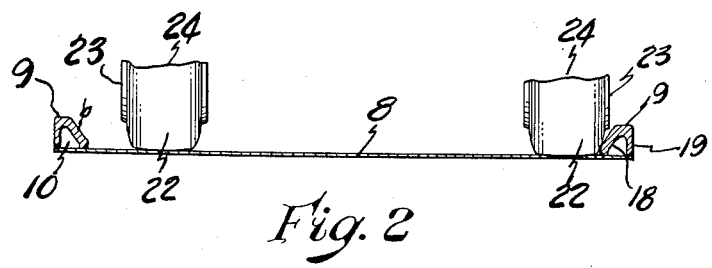
FIG. 2 is a fragmentary, transverse sectional view taken on the line 2—2 of FIG. 1.

Each side curb 9 is shaped as clearly shown in FIGS. 1, 2 and 3 of the drawings, and is composed of spaced-apart wall or leg portions 18 and 19 connected at the top by means of a heavy section 20, the outer leg 19 being preferably vertical as shown, but the inner leg 18 has a relatively limited vertical wall section $a$ at its lower end which is of less height than the height of the wall 19 and which also is of less height than the height above the floor plate of the wheel rims 23, as is clearly shown in FIGURE 2; thence the remainder of the leg is outwardly sloped or inclined as at $b$, merging with the upper thickened section 20 at the top, thus providing a rigid low side curb which is extremely advantageous in this type structure.

A longitudinally extending convex bead or rib 21 extends the full length of the side curb 9, but no part of the rib extends inwardly of the plane of the vertical wall $a$. The rib is located substantially at the point where the inclined wall section $b$ of the side curb merges or joins with the vertical section $a$, said rib providing a smooth, gently rounded surface which will not injure the tire 22 of a truck should it accidentally come into contact therewith, or with any part of the side curb during its travel over the dockboard. This sloped surface $b$ also provides clearance for the metal rim 23 of the wheel 24, so that there will be no contact with or gouging of the side curb by the rim of the wheel to weaken it structurally, or provide splinters or rough surfaces which might be injurious to the vehicle tires, or the workman's hands and clothing when handling the dockboard.

The end sections C can be easily and quickly applied; they are of rugged, substantial construction and are suitably curved and flared so that they mate with the side curbs; there are no sharp corners or obstructions, and openings 25 are provided in the side walls (see FIG. 6) to form handholds to facilitate handling.

Figure 4:
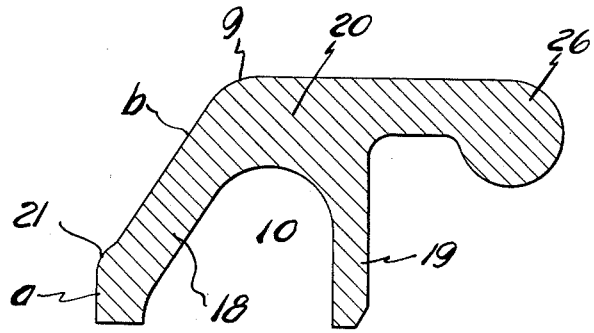
FIG. 4 is a tranverse sectional view showing a modified side curb.

In FIG. 4 of the drawings I have shown a modified construction in which an overhanging rib section 26 is provided on the curb 9, said overhanging section reinforcing the curb and also forming a convenient continuous handhold to facilitate handling thereof.

While the dockboard is preferably formed of magnesium, so that it can be readily handled by one person, it will be obvious that it can be formed of any other desired material; however, I find that while magnesium is light in weight, it is sufficiently rigid to support any loads to which a dockboard of this nature is subjected.

From the foregoing description, it will be obvious that I have perfected a very simple, practical, rigid and relatively inexpensive dockboard.

What I claim is:

1. A dockboard construction adapted to bridge a gap between a loading dock and a carrier to be loaded or unloaded at said dock and over which a vehicle having rubber tires mounted on metal wheel rims may carry goods to or from said carrier, said dockboard construction comprising a floorplate having a width between its two side edges to accommodate said vehicle, and a curb rail fixed to said floorplate at each of the side edges of the latter, each of said curb rails comprising an outer wall extending above said floorplate and located substantially flush with the associated side edge of the latter, an inner wall substantially parallel with said outer wall and spaced therefrom, said inner wall extending above said floorplate a distance substantially less than said outer wall and being of less height than the height of the wheel rims of said vehicle above said floorplate when said vehicle is supported on said floorplate, and a wall joined to said inner wall adjacent to the upper edge of the latter and having a substantially flat exposed surface sloping upwardly from its juncture with said inner wall in a direction towards said outer wall, the juncture of said sloping wall with said inner wall being smoothly rounded to form a convex bead extending longitudinally of the rail at the upper edge of said inner wall, no portion of said bead being located inwardly of the plane of the inner surface of said inner wall, said outer wall and said sloping wall being joined to one another at the upper edge of said outer wall.

2. The construction set forth in claim 1 wherein each of said curb rails is shorter in length than said floorplate and wherein the ends of each curb rail terminate short of the adjacent end of said floorplate, and including a pair of end curb sections fixed one at either end of each curb rail, each of said end curb sections having inner, outer, and sloping walls forming continuations of the corresponding walls of the associated curb rail, the inner wall of each of said end curb sections curving towards its outer wall in a direction towards its outer wall in a direction towards the adjacent end of said floorplate.

3. The construction set forth in claim 2 wherein each curb rail is provided with an opening at each of its ends and wherein the end of each end curb section adjacent to an end of said curb rail is equipped with a projection snugly received in the opening of the adjacent curb rail end.

References Cited in the file of this patent

UNITED STATES PATENTS

| | | |
|---|---|---|
| 387,308 | MacKnight | Aug. 7, 1888 |
| 427,648 | Webb | May 13, 1890 |
| 1,606,588 | Meermans | Nov. 9, 1926 |
| 1,726,267 | Higgins | Aug. 27, 1929 |
| 1,754,939 | Fliflet | Apr. 5, 1930 |
| 2,129,503 | Mulieri | Sept. 6, 1938 |
| 2,149,548 | Rasmussen | Mar. 7, 1939 |
| 2,496,445 | Daniels | Feb. 7, 1950 |

FOREIGN PATENTS

| | | |
|---|---|---|
| 513,358 | Great Britain | Oct. 10, 1939 |